(12) United States Patent
Meng et al.

(10) Patent No.: US 8,461,226 B2
(45) Date of Patent: Jun. 11, 2013

(54) CONTACT LENS

(75) Inventors: Richard Fanqing Meng, Rochester, NY (US); Shane Mao, Pittsford, NY (US); Lawrence Chapoy, Barrington Hills, IL (US)

(73) Assignee: Bausch & Lomb Incorporated, Rochester, NY (US)

( * ) Notice: Subject to any disclaimer, the term of this patent is extended or adjusted under 35 U.S.C. 154(b) by 199 days.

(21) Appl. No.: 12/835,048

(22) Filed: Jul. 13, 2010

(65) Prior Publication Data

US 2011/0063568 A1    Mar. 17, 2011

Related U.S. Application Data

(60) Provisional application No. 61/228,220, filed on Jul. 24, 2009.

(51) Int. Cl.
| | | |
|---|---|---|
| *G02B 1/04* | (2006.01) | |
| *B29D 11/00* | (2006.01) | |
| *A61K 9/00* | (2006.01) | |
| *G02C 7/04* | (2006.01) | |

(52) U.S. Cl.
USPC ...... 523/106; 523/108; 424/429; 351/159.24; 351/159.73

(58) Field of Classification Search
USPC .............. 523/106, 108; 424/429; 351/159.24, 351/159.73
See application file for complete search history.

(56) References Cited

U.S. PATENT DOCUMENTS

| 4,719,657 A | 1/1988 | Bawa |
| 5,120,121 A | 6/1992 | Rawlings et al. |
| 6,902,274 B2 * | 6/2005 | Tucker .................... 351/159.28 |
| 2004/0001181 A1 | 1/2004 | Kunzler et al. |
| 2008/0128930 A1 * | 6/2008 | Lai et al. ........................ 264/2.6 |

FOREIGN PATENT DOCUMENTS

| EP | 382005 A2 * | 8/1990 |
| WO | WO03/000500 A1 | 1/2003 |
| WO | WO2009/055189 A1 | 4/2009 |

* cited by examiner

*Primary Examiner* — Michael Pepitone
(74) *Attorney, Agent, or Firm* — John E. Thomas

(57) ABSTRACT

A method of making a contact lens involves depositing on a portion of a molding surface of a contact lens mold a colorant composition comprising a pigment, a copolymer of 2-hydroxyethylmethacrylate and N-vinylpyrrolidinone, and a crosslinking monomer.

8 Claims, No Drawings

CONTACT LENS

PRIORITY CLAIMS TO PRIOR APPLICATIONS

This application claims the benefit of Provisional Patent Application No. 61/228,220 filed Jul. 24, 2009 which is incorporated by reference herein.

FIELD

This invention provides a contact lens comprising a hydrophilic copolymer substrate and a colorant-containing composition on a surface of the substrate. The colorant-containing composition comprises a pigment, a copolymer of 2-hydroxyethylmethacrylate and N-vinylpyrrolidinone, and a crosslinking monomer.

BACKGROUND OF THE INVENTION

A representative crosslinking monomer is ethyleneglycoldimethacrylate or 1,4-butanedioldiacrylate. A representative pigment is iron oxide black or iron oxide brown.

The colorant-containing composition may include other components. A first example is a hydrophilic comonomer, such as 2-hydroxyethylmethacrylate. A second example is a hydrophobic comonomer, such as 2-butoxyethylacrylate. A third example is ethyl lactate. Additionally, these compositions will generally include a polymerization initiator.

The contact lens substrate can be made of any known hydrophilic copolymer. A preferred copolymer is hilafilcon B, which is the polymerization product of a monomer mixture comprising 2-hydroxyethylmethacrylate, N-vinylpyrrolidinone, ethyleneglycoldimethacrylate, and allylmethacrylate.

Preferably, the colorant-containing composition has a concentric ring shape on the surface. Most preferably, the concentric ring essentially conforms to a position of a human iris when the contact lens is placed on the eye, and may have a larger outer diameter than a human iris.

SUMMARY OF INVENTION

The invention provides a method of making the contact lens comprising:
  depositing on a portion of a molding surface of a contact lens mold a colorant composition comprising a pigment, a copolymer of 2-hydroxyethylmethacrylate and N-vinylpyrrolidinone, and a crosslinking monomer, and at least partially curing the colorant composition by exposure to thermal or light energy; and
  depositing a lens-forming monomer mixture in the mold, and curing the lens-forming monomer mixture, wherein the colorant composition is on a surface of the cured contact lens.

Preferably, the contact lens mold is made of a polyolefin, most preferably polypropylene. The colorant composition is deposited on a portion of the molding surface of a contact lens mold, preferably an anterior contact lens mold. The colorant composition may be applied with a pad. For example, the colorant composition is first applied to the pad from a cliché having the desired colorant pattern, and then the colorant composition is transferred from the pad to the contact lens molding surface.

As mentioned previously, the colorant composition is preferably applied to form a concentric ring shape that essentially conforms to a position of a human iris when the contact lens is placed on the eye.

The colorant composition is at least partially cured, prior to depositing the lens-forming monomer mixture in the mold. A preferred method of curing is by exposing the colorant composition to light energy, most preferably UV light.

Following curing of the lens-forming monomer mixture, the contact lens is released from the mold, preferably by a dry release method.

It is important that the colorant composition has various physical properties that approximate those of the hydrophilic contact lens substrate copolymer. These properties include coefficient of expansion and water content. Otherwise, the cured colorant composition may not bind adequately with the contact lens substrate. This is especially important for processes where the contact lens is dry released from the mold so that both the colorant composition and the contact lens substrate copolymer do not have significantly different adhesion to the mold material.

However, it is also important that the colorant composition is printable on the molding surface. Polypropylene is relatively hydrophobic, and when employing a hydrophilic colorant composition, the composition has a tendency to bead up. A prior approach to this problem involved subjecting the contact lens molding surface to a high energy source, such as corona discharge. However, it is difficult to control such treatments, and such treatments require longer production times and higher production costs. For the present invention, it is preferred that the contact lens mold is not subjected to any such high energy treatment. Rather, the colorant composition may employ a water miscible solvent so that the surface tension of the colorant composition better matches that of the mold material. Also, employing colorant compositions with sufficiently high viscosity (at least 2000 cp) can offset the composition's higher surface tension to prevent beading up on the mold surface.

DETAILED DESCRIPTION OF THE PREFERRED EMBODIMENTS

The following examples illustrate various embodiments of the present invention.

Example 1

Synthesis of Poly(HEMA-co-NVP)

To a 2 L 3-neck round bottom flask equipped with mechanical stirring, condenser and nitrogen inlet were added 2-hydroxyethyl methacrylate (HEMA) (344.4 g, 2.65 moles), N-vinylpyrrolidone (NVP) (165 g, 1.48 moles), 2-mercaptoethanol (4.68 g, 0.06 moles) and cyclopentanone (684 g, 720 ml). The above mixture was purged by bubbling $N_2$ for 15 minutes before Vazo 64 initiator was added. The reaction was heated to 38° C. for 48 hours, then to 70° C. overnight. This solution was diluted with 1200 ml isopropanol (IPA). The resultant solution was added to 6 L diethyl ether dropwise slowly from an addition funnel under vigorous stirring from mechanical stirrer. 500 g white power was collected after being filtered and dried at 70° C. oven under vacuum (30 mmHg) overnight.

The reaction is illustrated below.

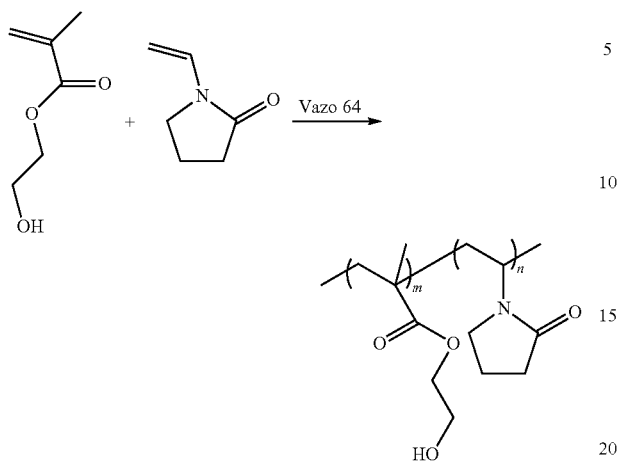

Example 2

Ink Containing Poly(HEMA-co-NVP) Copolymer a. Formation of Iron Oxide Black-Containing Paste 210 g of zirconium oxide ceramic media, 210 g iron oxide black and 210 g ethyl lactate was added into a 500-ml ceramic jar, and thoroughly mixed with a paint shaker for 200 minutes. The paste had a particle size of 5 μm. This paste with the ceramic media was added to a sieve installed in a jar, and the jar was then sealed with its cap and another counter jar. The assembly was centrifuged, and all paste was deposited on the bottom of the jar through the sieve and all ceramic beads remained in the sieve. The particle size of the iron oxide black was 5 μm.

b. Formation of Binder Solution 53.27 g poly(HEMA-co-NVP) ($W_M$=20,810) and 35.51 g (−) Ethyl Lactate was added to a 500-ml plastic cup, mixed thoroughly for 10 minutes, and allowed to sit overnight after mixing. 88.97 g binder solution containing 60% copolymer was made.

c. Formation of Activation Solution 14.00 g HEMA was added to a 30-ml brown glass vial with a magnetic bar, then 3 g EGDMA and 3 g Lucirin TPO initiator were added in sequence. The mixture was stirred till the solid initiator was dissolved (about 10 minutes). 20 g activation solution was obtained.

d. Formation of Ink Composition 88.79 g iron oxide black-containing paste, 88.79 g binder solution and 19.73 g activation solution were added sequentially to a 500 ml plastic cup, mixed for 10 minutes, to obtain 197.30 g ink composition containing the following components.

TABLE 1

| Component | Wt. % |
| --- | --- |
| Iron Oxide Black | 22.5 |
| Poly(HEMA-co-NVP) | 27 |
| (−) Ethyl lactate | 40.5 |
| HEMA | 7 |
| EGDMA | 1.50 |
| Lucirin TPO initiator | 1.50 |
| Total | 100.00 |

The ink composition had the following viscosity profile, as measured with a Brookfield digital viscometer, Model DV-II+, Spindle: SPE-51; Temperature: 25.4° C.

| Speed (cP) | % Torque | Viscosity |
| --- | --- | --- |
| 0.5 | 4.9 | 5074 |
| 1 | 7 | 3625 |
| 2 | 9.4 | 2434 |
| 2.5 | 11.4 | 2361 |
| 4 | 14.7 | 1903 |
| 5 | 16.6 | 1719 |

Comparative Example 3

Poly(HEMA) Ink Composition

An ink composition is prepared from the following components.

TABLE 2

| Component | Wt. % |
| --- | --- |
| Iron Oxide Black | 22.00 |
| Poly-HEMA | 27.60 |
| Ethyl lactate | 22.00 |
| Cyclopentanone | 18.40 |
| HEMA | 9.00 |
| EGDMA | 0.50 |
| Lucirin TPO initiator | 0.50 |
| Total | 100.00 | a. Formation of Binder Solution 41.40 g poly-HEMA ($W_M$=20,000) and 27.60 g Cyclopentanone were added to a 500-ml plastic cup, mixed thoroughly for 10 minutes, and allowed to sit overnight after mixing. 67.57 g binder solution of 60% poly-HEMA was obtained.

b. Activation Solution 13.5.00 g HEMA was added to a 30-ml brown glass vial with a magnetic stir bar, and 0.73 g EGDMA and 0.73 g Lucirin TPO initiator were added sequentially. The mixture was stirred until the solid initiator was dissolved (about 10 minutes). 15.00 g activation solution was obtained.

c. Ink Composition 64.63 g iron oxide black-containing paste from Example 2a, 67.57 g poly-HEMA binder solution and 14.69 g activation solution were added sequentially to a 500-ml plastic cup, and mixed for 10 minutes. The ink composition had the following viscosity profile, as measured with a Brookfield digital viscometer, Model DV-II+, Spindle: SPE-51; Temperature: 25.4° C.

| Speed (cP) | % Torque | Viscosity |
| --- | --- | --- |
| 0.5 | 4.5 | 4660 |
| 1 | 7.3 | 3780 |
| 2 | 10.1 | 2615 |
| 2.5 | 12.2 | 2527 |
| 4 | 15.2 | 1968 |
| 5 | 17.1 | 1771 |

Example 4

Ink Containing Poly(HEMA-co-NVP) Copolymer

TABLE 3

| Final Ink Formula | Actual Wt. % |
|---|---|
| Iron Oxide Brown | 20 |
| Poly(HEMA-co-NVP) | 30 |
| Ethyl lactate | 40 |
| 2-butoxyethyl acrylate | 7 |
| 1,4-Butanediol diacrylate | 1.50 |
| Lucirin TPO initiator | 1.50 |
| Total | 100.00 | a. Following the general procedure of Example 2a, but substituting iron oxide brown pigment, a pigment paste is obtained.

b. Following the general procedure of Example 2b, poly (HEMA-co-NVP) and ethyl lactate are combined to form a binder solution and was added to a 500-ml plastic cup, mixed thoroughly for 10 minutes, and allowed to sit overnight after mixing. 88.97 g binder solution containing 60% copolymer was made.

c. Following the general procedures of Example 2c, 2-butoxyethyl acrylate, 1,4-butanediol diacrylate and Lucirin TPO initiator are combined to form an activation solution.

d. Following the general procedure of Example 2d, the iron oxide brown-containing pigment, binder solution and activation solution are combined to form an ink composition.

The examples and illustrated embodiments demonstrate some of the sustained release embodiments of the present invention. However, it is to be understood that these examples are for illustrative purposes only and do not purport to be wholly definitive as to the conditions and scope. While the invention has been described in connection with various preferred embodiments, numerous variations will be apparent to a person of ordinary skill in the art given the present description, without departing from the spirit of the invention and the scope of the appended claims.

We claim:

1. A method of making a contact lens comprising:
   depositing on a portion of a molding surface of a contact lens mold a colorant composition comprising a pigment, a copolymer of 2-hydroxyethylmethacrylate and N-vinylpyrrolidinone, and a crosslinking monomer, the colorant composition having a Brookfield viscosity of at least 2000 cp and the contact lens mold is made of a polyolefin;
   at least partially curing the colorant composition;
   depositing a lens-forming monomer mixture in the mold, and curing the lens-forming monomer mixture,
   wherein the colorant composition is on a surface of the cured contact lens.

2. The method of claim 1, wherein the contact lens mold is made of polypropylene.

3. The method of claim 1, wherein the colorant composition is deposited on the portion of the molding surface of an anterior contact lens mold.

4. The method of claim 1, wherein the lens-forming monomer mixture comprises hydroxyethylmethacrylate, N-vinylpyrrolidinone, and a crosslinking monomer.

5. The method of claim 1, wherein the colorant composition is deposited to form a concentric ring shape.

6. The method of claim 5, wherein the concentric ring essentially conforms to a position of a human iris when the contact lens is placed on the eye.

7. The method of claim 6, wherein the concentric ring has a larger outer diameter than a human iris.

8. The method of claim 1, further comprising, following curing of the lens-forming monomer mixture, dry releasing the contact lens from the mold.

* * * * *